(12) United States Patent
Segovia et al.

(10) Patent No.: US 9,115,698 B2
(45) Date of Patent: Aug. 25, 2015

(54) WIND TURBINE WITH ACCESS FEATURES FOR GAINING ACCESS TO THE INTERIOR OF A ROTOR HUB

(75) Inventors: Eugenio Yegro Segovia, Madrid (ES); Ronald Eduard Stam, Hengelo (NL); Alvaro Jaime Calle Garrido, Madrid (ES); Vidya Sagar Meesala, Rheine (DE); Sjouke Jan van der Zee, Enschede (NL)

(73) Assignee: General Electric Company, Schenectady, NY (US)

( * ) Notice: Subject to any disclaimer, the term of this patent is extended or adjusted under 35 U.S.C. 154(b) by 694 days.

(21) Appl. No.: 13/413,154

(22) Filed: Mar. 6, 2012

(65) Prior Publication Data

US 2013/0236311 A1 Sep. 12, 2013

(51) Int. Cl.
*F03D 11/00* (2006.01)
*F03D 1/06* (2006.01)
*F03D 1/00* (2006.01)

(52) U.S. Cl.
CPC .............. *F03D 1/0691* (2013.01); *F03D 1/003* (2013.01); *F05B 2240/14* (2013.01); *Y02E 10/721* (2013.01); *Y02E 10/726* (2013.01); *Y10T 29/49826* (2015.01)

(58) Field of Classification Search
USPC .......... 416/244 R, 245 R, 155, 156; 415/908, 415/218.1
See application file for complete search history.

(56) References Cited

U.S. PATENT DOCUMENTS

| | | | |
|---|---|---|---|
| 7,244,102 B2 | 7/2007 | Delucis | |
| 7,614,850 B2 * | 11/2009 | Rogall | ........................ 416/155 |
| 8,308,434 B2 * | 11/2012 | Numajiri | ........................ 416/95 |
| 2008/0118365 A1 * | 5/2008 | Bendel et al. | ............. 416/244 R |

* cited by examiner

*Primary Examiner* — Dwayne J White
*Assistant Examiner* — Justin Seabe
(74) *Attorney, Agent, or Firm* — Dority & Manning, P.A.

(57) ABSTRACT

A wind turbine including a nacelle and a rotor hub is disclosed. The nacelle may extend between a hub end and an aft end and may define a nacelle shaft opening and a nacelle access port at the hub end. The rotor hub may extend between a first end and a second end, with the second end being disposed adjacent to the hub end of the nacelle. The rotor hub may also define a hub shaft opening at the second end and a hub access port generally adjacent to the hub shaft opening. In addition, the wind turbine may include an access bridge configured to extend between the nacelle and the rotor hub so as to provide access between the nacelle access port and the hub access port.

19 Claims, 5 Drawing Sheets

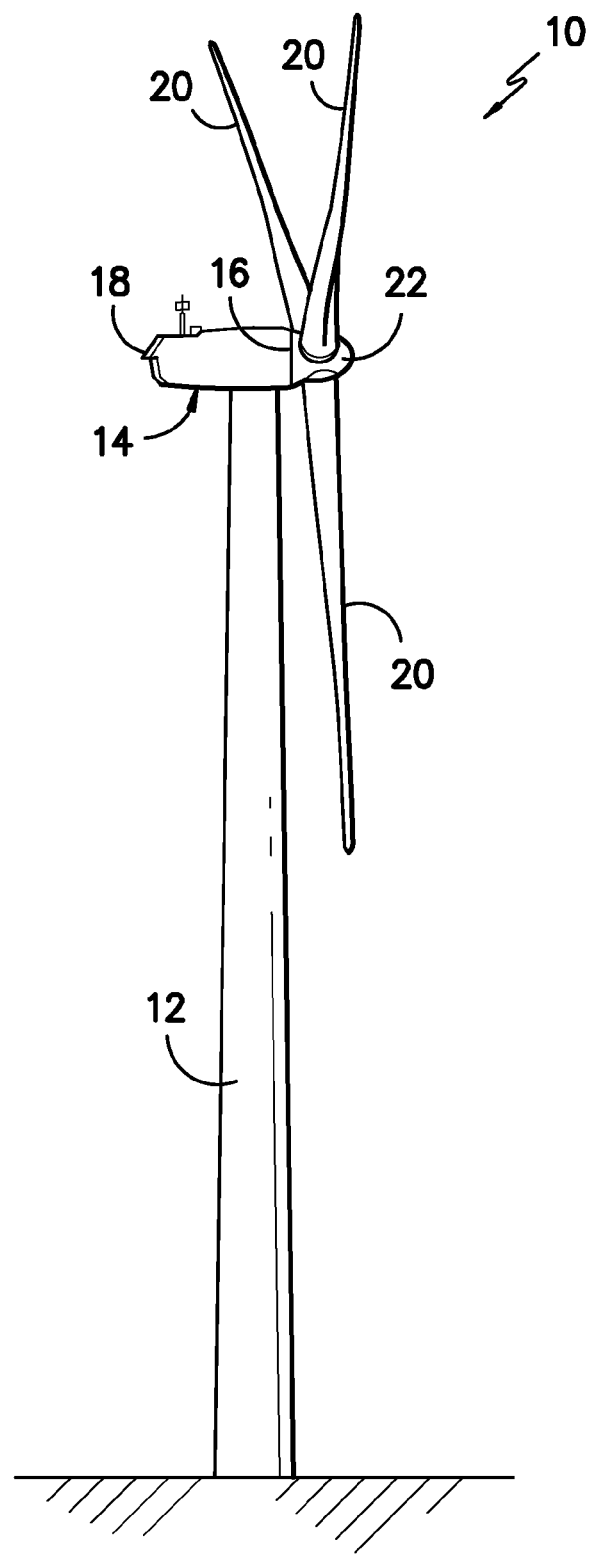
FIG. -1-

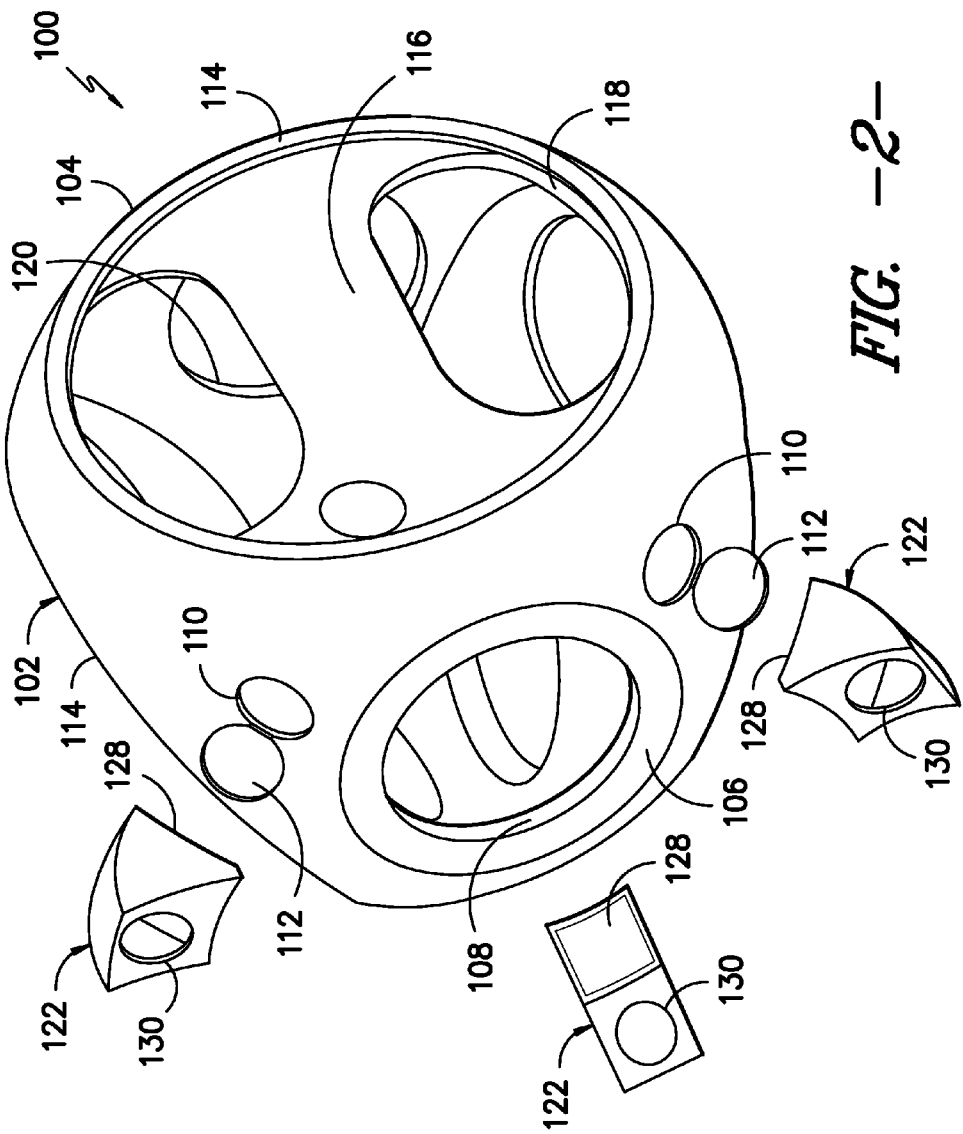
FIG. -2-

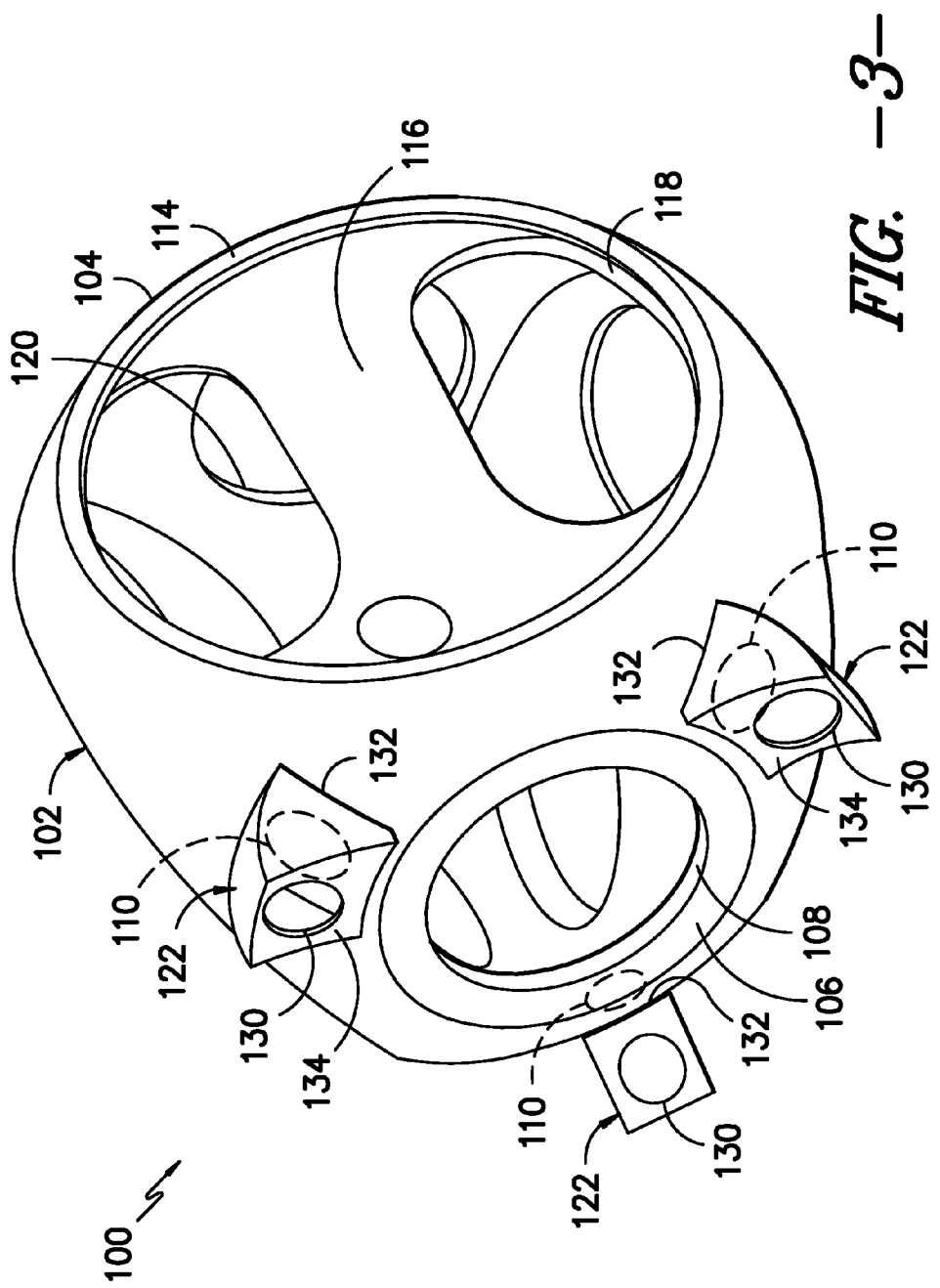

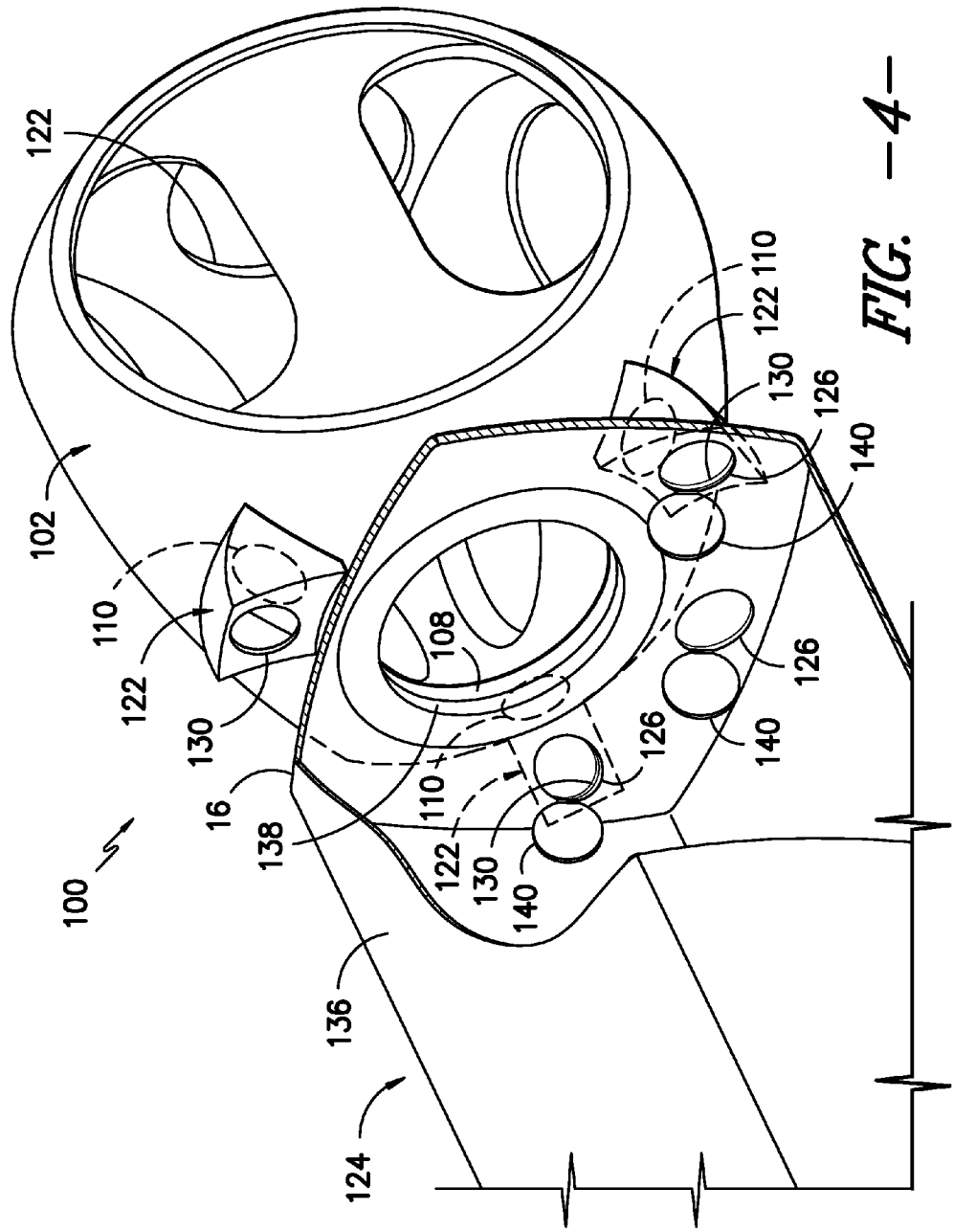
FIG. -4-

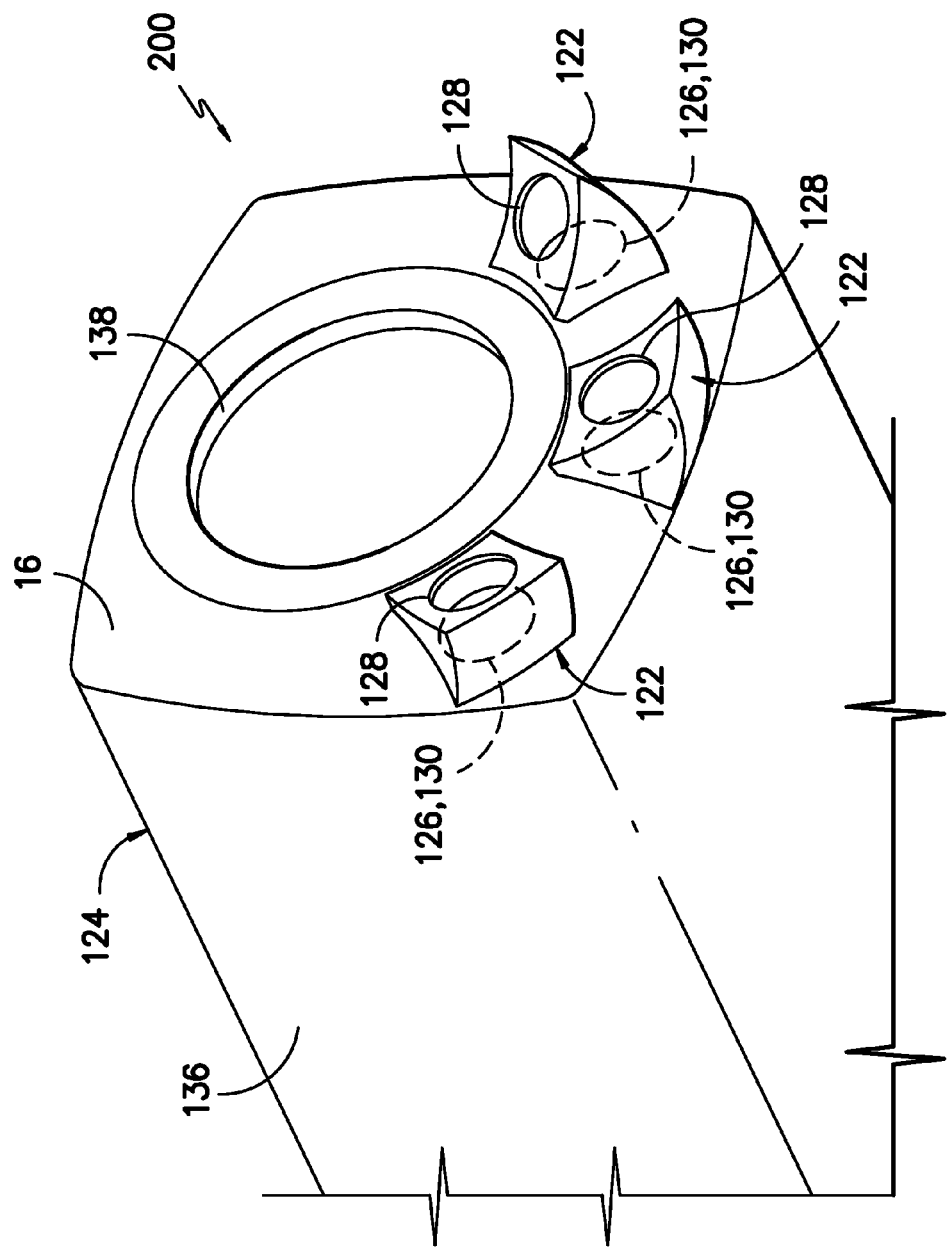

WIND TURBINE WITH ACCESS FEATURES FOR GAINING ACCESS TO THE INTERIOR OF A ROTOR HUB

FIELD OF THE INVENTION

The present subject matter relates generally to wind turbines and, more particularly, to a wind turbine having access features that permit a service worker to safely and efficiently gain access to the interior of a rotor hub.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, rotor hub and one or more rotor blades. The rotor blades capture kinetic energy of the wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

In order to perform certain types of maintenance on the rotor hub, the rotor blades and/or various other components of the wind turbine, a service worker must gain internal access to the rotor hub. Typically, such access is gained through an access port located at the front end of the rotor hub (i.e., the end of the rotor hub furthest away from the nacelle). Thus, to reach the access port, a service worker must typically climb onto the top of the nacelle, move over to the top of the rotor hub and repel down the front of the rotor hub. Unfortunately, since the service worker must climb outside the wind turbine, significant safety risks are associated with gaining access to the interior of the rotor hub. As a result, service workers are not able to gain internal access to the rotor hub when adverse weather conditions exist, such as high winds, rain, snow, hail, etc.

Accordingly, a wind turbine having access features that permit a service worker to safely and efficiently gain access to the interior of a rotor hub, including when adverse weather conditions exist, would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter discloses a wind turbine including a nacelle and a rotor hub. The nacelle may extend between a hub end and an aft end and may define a nacelle shaft opening and a nacelle access port at the hub end. The rotor hub may extend between a first end and a second end, with the second end being disposed adjacent to the hub end of the nacelle. The rotor hub may also define a hub shaft opening at the second end and a hub access port generally adjacent to the hub shaft opening. In addition, the wind turbine may include an access bridge configured to extend between the nacelle and the rotor hub so as to provide access between the nacelle access port and the hub access port.

In another aspect, the present subject matter discloses a rotor hub assembly for a wind turbine. The rotor hub assembly may include a rotor hub extending between a first end and a second end. The rotor hub may define a shaft opening at the second end and a hub access port generally adjacent to the shaft opening. In addition, the rotor hub assembly may include an access bridge extending from the rotor hub at the hub access port.

In a further aspect, the present subject matter discloses a method for providing internal access to a rotor hub of a wind turbine from the interior of a nacelle of the wind turbine. The method may generally include forming a nacelle access port in the nacelle, forming a hub access port in the rotor hub and positioning an access bridge between the nacelle and the rotor hub.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine;

FIG. 2 illustrates a perspective, exploded view of one embodiment of a rotor hub assembly in accordance with aspects of the present subject matter;

FIG. 3 illustrates a perspective, assembled view of the rotor hub assembly shown in FIG. 2;

FIG. 4 illustrates a perspective, cut-away view of a portion of one embodiment a nacelle, particularly illustrating the rotor hub assembly shown in FIGS. 2 and 3 disposed in its assembled position relative to a hub end of the nacelle; and, FIG. 5 illustrates a perspective view of one embodiment of a nacelle assembly in accordance with aspects of the present subject matter.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a wind turbine having access features that permit a service worker to safely and efficiently gain access to the interior of a rotor hub. For example, in several embodiments, corresponding access ports may be defined in both the nacelle and the rotor hub. In addition, an access bridge may extend between the nacelle and the rotor hub so as to define an enclosed passageway between the nacelle access port and corresponding hub access port. As such, a service worker located within the nacelle may move into the access bridge through the nacelle access port and then move into the rotor hub through the hub access port.

Referring now to the drawings, FIG. 1 illustrates a perspective view of one embodiment of a wind turbine 10. The wind turbine 10 includes a tower 12 with a nacelle 14 mounted thereon, with the nacelle 14 generally extending between a hub end 16 and an aft end 18. A plurality of rotor blades 20 are mounted to a rotor hub 22, which is, in turn, coupled to the hub end 16 of the nacelle 14 via a rotor shaft (not shown) of the wind turbine 10. The wind turbine power generation and control components (not shown) may be housed within the nacelle 14. It should be appreciated that the wind turbine 10 of FIG. 1 is provided for illustrative purposes only to place the present subject matter in an exemplary field of use. Thus, one of ordinary skill in the art should understand that the present subject matter is not limited to any particular type of wind turbine configuration.

Referring now to FIGS. 2 and 3, one embodiment of a rotor hub assembly 100 that may be utilized with the wind turbine 10 shown in FIG. 1 is illustrated in accordance with aspects of the present subject matter. In particular, FIG. 2 illustrates an exploded view of the rotor hub assembly 100 and FIG. 3 illustrates an assembled view of the rotor hub assembly 100.

As shown, the rotor hub assembly 100 generally includes a rotor hub 102 configured for coupling the rotor blades 20 of a wind turbine 10 to the rotor shaft (not shown) of the wind turbine 10. In general, the rotor hub 102 may be configured the same as or similar to any suitable rotor hubs known in the art (e.g., by being configured similar to the rotor hub 22 shown in FIG. 1). For example, the rotor hub 102 may comprise a hollow body extending between a first end 104 and a second end 106. The first end 104 may generally correspond to the forward end of the rotor hub 102 (i.e., the end furthest away from the nacelle 14 when the rotor hub 102 is disposed in its assembled position on a wind turbine 10) and the second end 106 may generally correspond to the aft end of the rotor hub 102 (i.e., the end closest to the nacelle 14 when the rotor hub 102 is disposed in its assembled position on a wind turbine 10). As shown in FIGS. 2 and 3, a shaft opening 108 may be defined in the second end 106 of the rotor hub 102. As is generally understood, when a wind turbine 10 is assembled, the shaft opening 108 may be configured to receive the rotor shaft (not shown) of the wind turbine 10 to facilitate mounting the rotor hub 102 to the shaft.

In addition, the rotor hub 102 may include one or more hub access ports 110 defined at the second end 106 of the rotor hub 102 generally adjacent to the shaft opening 108. For example, as shown in the illustrated embodiment, three hub access ports 110 (two of which are shown) may be defined in the rotor hub 102 adjacent to the shaft opening 108. In such an embodiment, the hub access ports 110 may be spaced apart around the shaft opening 108 with any suitable circumferential spacing, such as by spacing the hub access ports 102 apart from one another by approximately 120 degrees. In other embodiments, the rotor hub 102 may include less than three hub access ports 110 (such as by defining one or two hub access ports 110 in the rotor hub 102) or greater than three hub access ports 110 (such as by defining four, five or more hub access ports 110 in the rotor hub 102). As will be described in greater detail below, the hub access ports 110 may generally be configured to permit a service worker to gain access to the interior of the rotor hub 102. Thus, it should be appreciated the hub access ports 110 may be sized such that a person may travel through each hub access port 110.

Additionally, in several embodiments, the rotor hub 102 may include a door or hatch 112 for each hub access port 110. For example, as shown in FIG. 2, the rotor hub 102 may include three hatches 112 (two of which are shown) for each of the three hub access ports 110. In general, the hatches 112 may be configured to be attached to the rotor hub 102 at the hub access ports 110 in order to provide a means for opening and closing the access ports 110. For example, in several embodiments, the hatches 112 may be hingedly attached to the rotor hub 102 at the hub access ports 110 so that each hatch 112 may be rotated relative to the rotor hub 102 in order to open and close its corresponding access port 110. In other embodiments, the hatches 112 may be removably attached to the rotor hub 102 at hub access ports 110 such that each hatch 112 may be detached and re-attached to the rotor hub 102 when opening and closing each access port 110.

As shown in FIGS. 2 and 3, the rotor hub 102 may also include a plurality of blade flanges 114 spaced apart around its outer perimeter. In general, the number of blade flanges 114 may correspond to the number of rotor blades 20 of the wind turbine 10. For instance, as shown in the illustrated embodiment, the rotor hub 102 includes three blade flanges 114, with each blade flange 114 being spaced apart from one another by approximately 120 degrees. Each blade flange 114 may generally be configured to be coupled to one of the rotor blades 16 via a pitch bearing (not shown) of the wind turbine 10. For example, in several embodiments, each blade flange 114 may define a generally planar, circular area to which a suitable pitch bearing may be secured (e.g., using bolts and/or any other suitable fastening mechanisms). In addition, the rotor hub 102 may also include one or more stiffening webs 116 extending across an opening 118 defined by each blade flange 114. As is generally understood, the stiffening web(s) 116 may be configured to increase the structural stiffness and rigidity of the rotor hub 102 at and/or adjacent to each blade flange 114.

It should be appreciated that, as described above, a front access port 120 may also be defined at the forward or first end 104 of the rotor hub 102. Although the present subject matter will generally be described herein with reference to accessing the interior of rotor hub 102 through the access ports 110 defined at the second end 106 of the rotor hub 102, the front access port 120 may also be utilized to gain access to the interior of the rotor hub 102. For example, in several embodiments, the front access port 120 may be utilized to receive and/or remove heavy or large components from the rotor hub 102 and/or to provide emergency access to the interior of the rotor hub 102.

It should also be appreciated that, in several embodiments, the hollow body of the rotor hub 102 may be formed as a single component, such as by casting the body of the rotor hub 102 using any suitable casting process and material. However, in other embodiments, the body of the rotor hub 102 may be formed from a plurality of components, such as by forming the body as a plurality of hub segments configured to be assembled together to form overall shape and configuration of the rotor hub 102.

Referring still to FIGS. 2 and 3, in several embodiments, the rotor hub assembly 100 may also include one or more access bridges 122. As will be described in greater detail below, the access bridges 122 may generally be configured to bridge the gap between the hub access ports 110 defined in the rotor hub 102 and one or more corresponding nacelle access ports 126 defined in the nacelle 124 (FIG. 4) of the wind turbine 10. As such, a service worker may gain access to the interior of the rotor hub 102 from the interior of the nacelle 124 via one of the access bridges 122. For example, as shown in FIGS. 2 and 3, each access bridge 122 may generally comprise a hollow structure defining an enclosed volume or passageway between a hub opening 128 (defined at one end of each access bridge 122) and a nacelle opening 130 (defined at the opposing end of each access bridge 122). Accordingly, a service worker may enter each access bridge 122 through the nacelle opening 130 and exit each access bridge 122 through the hub opening 128 and vice versa.

In several embodiments, the access bridges 122 may be configured to be coupled directly to the rotor hub 102 such that the hub opening 128 of each access bridge 122 is aligned with one of the hub access ports 110. For example, as shown in FIGS. 2 and 3, the access bridges 122 may comprise separate components configured to be separately attached to the rotor hub 102. In such an embodiment, the access bridges 122 may be mounted to the rotor hub 102 over the hub access ports 110 using any suitable fastening means and/or method known in the art, such as by mounting each access bridge 122 to the rotor hub 102 using suitable fastening mechanisms (e.g., bolts, screws, pin, rivets and/or the like) or by welding each access bridge 122 to the rotor hub 102. Alternatively, the access bridges 122 may be formed integrally with the rotor hub 102, such as by casting the hollow body of the rotor hub 102 and the access bridges 122 together as single component. In such an embodiment, each hub access port 110 may generally correspond to hub opening 128 of each access bridge 122 such that an enclosed volume or passageway is defined between each nacelle opening 130 and each hub access port 110. Regardless, by properly positioning the access bridges 122 on the rotor hub 102 relative to the hub access ports 110, a service worker entering the nacelle opening 130 of one of the access bridges 122 may travel through the access bridge 122 and gain access to the interior of the rotor hub 102 via the hub access port 110.

It should be appreciated that, in alternative embodiments, the access bridges 122 may be configured to be coupled to the nacelle 124 (FIGS. 5) instead of being coupled to the rotor hub 102. In such embodiments, the rotor hub 102 may be rotated relative to the nacelle 124 in order to align the hub access ports 110 with the hub openings 128, thereby allowing a service worker positioned within one of the access bridges 122 to gain access to the interior of the rotor hub 102.

It should also be appreciated that the particular configuration of the access bridges 122 may generally vary depending on the configuration of the wind turbine 10 with which the access bridges 122 are being utilized. For example, as shown in FIG. 3, in one embodiment, the portion of each access bridge 122 defining the hub opening 128 may have a curved profile 132 generally corresponding to the curved profile of the rotor hub 102 at or adjacent to each hub access port 110. Similarly, the portion of each access bridge 122 defining the nacelle opening 130 may have a curved profile 134 generally corresponding to the curved profile of the hub end 16 of the nacelle 124 (FIG. 4). As such, when the rotor hub 102 is rotated relative to the nacelle 124, the access bridges 122 may be disposed immediately adjacent to the nacelle 124 without actually contacting the nacelle 124.

Additionally, it should be appreciated that the access bridges 122 may generally be formed from any suitable material that is capable of supporting the weight of one or more service workers as such worker(s) travels within the access bridges 122 between the nacelle 124 and the rotor hub 102. For example, in several embodiments, the access bridges 122 may be formed from a fiber reinforced composite material, a metal material, a reinforced plastic material and/or the like.

Referring now to FIG. 4, a perspective, cut-away view of a portion of one embodiment of a wind turbine nacelle 124 is illustrated in accordance with aspects of the present subject matter, particularly illustrating the rotor hub assembly 102 shown in FIGS. 2 and 3 disposed in its assembled position at a hub end 16 of the nacelle 124.

In general, the nacelle 124 may be configured the same as or similar to any suitable nacelles known in the art (e.g., by being configured similar to the nacelle 14 shown in FIG. 1). Thus, the nacelle 124 may generally include an outer nacelle cover 136 configured to surround the various components (not shown) of the wind turbine 10 housed within the nacelle 124. In general, the nacelle cover 124 may extend between a hub end 16 and an aft end 18 (FIG. 1). Additionally, as shown in FIG. 4, a shaft opening 138 may be defined at the hub end 16 of the nacelle cover 136 for receiving the rotor shaft (not shown) of the wind turbine 10. In general, the shaft opening 138 of the nacelle 124 may be configured to be aligned with the shaft opening 108 of the rotor hub 102 when the nacelle 124 and rotor hub 102 are disposed in their assembled positions on the wind turbine 10. As such, the rotor shaft may be received through both the nacelle shaft opening 138 and the hub shaft opening 108, thereby coupling the rotor hub 102 to the nacelle 124.

In addition, the nacelle 124 may include one or more nacelle access ports 126 defined at the hub end 16 of the nacelle cover 136. For example, as shown in the illustrated embodiment, the nacelle 124 includes three nacelle access ports 126 spaced apart around the shaft opening 138. Specifically, as shown in FIG. 4, the nacelle access ports 126 are positioned around a lower portion of the shaft opening 138 (e.g., by being aligned with the lower right, lower left and bottom of the shaft opening 138) and are spaced apart from one another relative to center of the shaft opening 138 by approximately 60 degrees. However, it should be appreciated that nacelle access ports 126 may be positioned at any other suitable location relative at the hub end 16 and may have any other suitable circumferential spacing relative to one another. Additionally, it should be appreciated that, in alternative embodiments, the nacelle 124 may include less than three nacelle access ports 126 (such as by defining one or two nacelle access ports 126 at the hub end 16 of the nacelle cover 136) or greater than three nacelle access ports 126 (such as by defining four, five or more nacelle access ports 126 at the hub end 16 of the nacelle cover 136.

Moreover, in several embodiments, the nacelle 124 may include a door or hatch 140 for each nacelle access port 126. For example, as shown in FIG. 4, the nacelle 124 includes three hatches 140 for each of the three nacelle access ports 126. In general, the hatches 140 may be configured to be attached to the hub end 16 of the nacelle cover 126 at the nacelle access ports 126 in order to provide a means for opening and closing the access ports 126. For example, in several embodiments, the hatches 140 may be hingedly attached to the nacelle cover 136 at the nacelle access ports 126 so that each hatch 140 may be rotated relative to the nacelle cover 136 in order to open and close its corresponding access port 126. In other embodiments, the hatches 140 may be removably attached to the nacelle cover 136 at the nacelle access ports 126 such that each hatch 140 may be detached and re-attached to the nacelle cover 136 when opening and closing each access port 126.

Referring still to FIG. 4, by configuring the access bridges 122 to extend between the nacelle 124 and rotor hub 102, a service worker may gain access to the interior of the rotor hub 102 from the interior of the nacelle 124 without having to access the exterior of the wind turbine 10. Specifically, to provide a service worker access to the interior of the rotor hub 102, the rotor hub 102 may be rotated relative to the nacelle 124 such that at least one of the nacelle access ports 126 is aligned with the nacelle opening 130 of at least one of the access doors 122. The service worker may then enter the access bridge 122 by traveling though the aligned nacelle access port 126 and opening 130. Once inside the access bridge 122, the service worker may then gain access to the interior of the rotor hub 102 by traveling through the hub opening 128 and hub access port 110.

It should be appreciated that the above described wind turbine configuration may provide numerous advantages for servicing the rotor hub 102 of a wind turbine 10. For example, by providing an access bridge 122 between corresponding hub and nacelle access ports 110, 126, service workers need not be required to gain access to the exterior of the wind turbine 10, thereby minimizing the safety risks associated with accessing the interior of the rotor hub 102. In addition, since the access bridges 122 provide an enclosed passageway between the nacelle 124 and the rotor hub 102, service works may be protected from undesirable or adverse weather conditions (e.g., rain, snow, hail, high winds, and/or the like). Moreover, by providing multiple access ports 110, 126 in the rotor hub 102 and/or the nacelle 124, the interior of the rotor hub 102 may be accessed at differing rotor blade positions. For example, it may be desirable to gain access to the interior of the rotor hub 102 while a particular rotor blade 16 of the wind turbine 10 is located parallel to the ground, perpendicular to the ground and/or at any other suitable angle relative to the ground.

Furthermore, in addition to increased safety, the access ports 110, 126 and access bridges 1222 generally provide a more efficient means for accessing the interior of the rotor hub 102 as compared to accessing the rotor hub 102 through the front access port 120. As such, it may be desirable to modify the configuration of the rotor hub 102, the rotor blades 16 and/or any other suitable components of the wind turbine 10 so that maintenance on such components may be performed from inside the rotor hub 102. For example, the rotor hub 102 and pitch bearings (not shown) may be designed so that the bolts used to connect such components may be serviced from within the rotor hub 102. In addition, the manual and/or automatic greasing systems for the pitch bearings may be designed so that the grease flow paths may be accessed from inside the rotor hub 102. Similarly, the seals for the pitch bearings may be designed so that they can be inspected and changed from inside the rotor hub 102.

Referring now to FIG. 5, one embodiment a nacelle assembly 200 is illustrated in accordance with aspects of the present subject matter. As shown, unlike the embodiments described above in which the access bridges 122 are configured to be coupled to the rotor hub 102, the access bridges 122 may be coupled directly to nacelle 124 such that the nacelle opening 130 of each access bridge 122 is aligned with one of the nacelle access ports 126. For example, the access bridges 122 may be mounted to the nacelle cover 136 over the nacelle access ports 126 using any suitable fastening means and/or method known in the art, such as by mounting each access bridge 122 to the nacelle cover 136 using suitable fastening mechanisms (e.g., bolts, screws, pin, rivets and/or the like) or by welding each access bridge 122 to the nacelle cover 136. Alternatively, the access bridges 122 may be formed integrally with all or a portion of the nacelle cover 136. In such an embodiment, each nacelle access port 126 may generally correspond to nacelle opening 130 of each access bridge 122 such that an enclosed volume or passageway is defined between each nacelle access port 126 and each hub opening 130.

It should be appreciated that the present subject matter is also directed to a method for gaining internal access to a rotor hub 102 of a wind turbine 10 from the interior of a nacelle 124 of the wind turbine 10. In several embodiments, the method may generally include moving through a nacelle access port 126 defined in the nacelle 124 and into an access bridge 122 extending between the nacelle 124 and the rotor hub 102. In addition, the method may include moving through a hub access port 110 defined in the rotor hub 102 and into the interior of the rotor hub 102. Moreover, in other embodiments, the method may include rotating the rotor hub 102 relative to the nacelle 124 such that the access bridge 122 is aligned with the nacelle access port 126 and the hub access port 110 and opening a hatch 112, 140 of at least one of the nacelle access port 126 or the hub access port 110.

It should also be appreciated that the present subject is also directed to a method for providing internal access to a rotor hub 102 of a wind turbine 10 from the interior of a nacelle 124 of the wind turbine 10. The method may generally include forming a nacelle access port 126 in the nacelle 124, forming a hub access port 110 in the rotor hub 102 and positioning an access bridge 122 between the nacelle 124 and the rotor hub 102. In such an embodiment, it should be appreciated that the access ports 126, 110 may be formed in the nacelle 124 and the rotor hub 102, respectively, using any suitable means, such as by cutting the access ports 126, 110 into such components or by pre-forming the access ports 126, 110 into such components (e.g., by casting the rotor hub 102 to include the access ports 110).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A wind turbine, comprising:
   a nacelle extending between a hub end and an aft end, the nacelle defining a nacelle shaft opening and a nacelle access port at the hub end;
   a rotor hub extending between a first end and a second end, the second end being disposed adjacent to the hub end of the nacelle, the rotor hub defining a hub shaft opening at the second end and a hub access port generally adjacent to the hub shaft opening, the second end of the rotor hub being spaced apart from the hub end of the nacelle such that an external gap is defined between the rotor hub and the nacelle at the hub access port, the external gap being external to both the rotor hub and the nacelle; and
   an access bridge configured to span the external gap defined between the nacelle and the rotor hub so as to provide access between the nacelle access port and the hub access port, the access bridge including a hollow structure defining an enclosed passageway extending between a hub opening positioned adjacent to the second end of the rotor hub and a nacelle opening positioned adjacent to the hub end of the nacelle, the enclosed passageway being separate from the external gap.

2. The wind turbine of claim 1, wherein the nacelle defines a plurality of nacelle access ports at the hub end.

3. The wind turbine of claim 2, wherein the plurality of nacelle access ports are spaced apart from one another by approximately 60 degrees.

4. The wind turbine of claim 1, wherein the rotor hub defines a plurality of hub access ports generally adjacent to the hub shaft opening.

5. The wind turbine of claim 4, wherein the plurality of hub access ports are spaced apart from one another by approximately 120 degrees.

6. The wind turbine of claim 1, wherein the access bridge is coupled to the nacelle at the nacelle access port.

7. The wind turbine of claim 1, wherein the access bridge is coupled to the rotor hub at the hub access port.

8. The wind turbine of claim 1, Wherein the nacelle further includes a hatch associated with the nacelle access port.

9. The wind turbine of claim 1, wherein the rotor hub further includes a hatch associated with the hub access port.

10. The wind turbine of claim 1, wherein the enclosed passageway is separated from the external gap by the hollow structure.

11. The wind turbine of claim 1, wherein the nacelle opening is configured to be aligned with the nacelle access port.

12. The wind turbine of claim 1, wherein the hub opening is configured to be aligned with the hub access port.

13. The wind turbine of claim 1, wherein the hub opening is larger than the hub access port.

14. The wind turbine of claim 1, wherein the external gap extends circumferentially between the second end of the rotor hub and the hub end of the nacelle, the access bridge only spanning across a circumferential portion of the external gap.

15. A rotor hub assembly for a wind turbine, the rotor hub assembly comprising a rotor hub extending between a first end and a second end, the rotor hub defining a shaft opening at the second end and first and second hub access ports generally adjacent to the shaft opening;

a first access bridge extending from the second end of the rotor hub at the first hub access port, the first access bridge defining a first enclosed passageway extending outwardly from the first hub access port; and a second access bridge extending from the second end of the rotor hub at the second hub access port, the second access bridge defining a second enclosed passageway extending outwardly from the second hub access port.

16. The rotor hub assembly of claim 15, wherein the first and second hub access ports are spaced apart from one another by approximately 120 degrees.

17. The rotor hub assembly of claim 15, wherein the first access bridge is coupled to the rotor hub at the first hub access port and the second access bridge is coupled to the rotor hub at the second hub access port.

18. The rotor hub assembly of claim 15, wherein the rotor hub includes a hatch associated with at least one of the first hub access port or the second hub access port.

19. The rotor hub assembly of claim 15, wherein the first and second enclosed passageways are extend to the rotor hub.

* * * * *